United States Patent
Fujimoto

(10) Patent No.: US 7,293,430 B2
(45) Date of Patent: Nov. 13, 2007

(54) PRESS MOLDING APPARATUS AND PRESS MOLDING METHOD OF OPTICAL ELEMENT

(75) Inventor: Tadayuki Fujimoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 400 days.

(21) Appl. No.: 10/938,566

(22) Filed: Sep. 13, 2004

(65) Prior Publication Data
US 2005/0120747 A1 Jun. 9, 2005

(30) Foreign Application Priority Data
Sep. 30, 2003 (JP) ............................. 2003-341632

(51) Int. Cl.
C03B 11/05 (2006.01)
C03B 11/16 (2006.01)

(52) U.S. Cl. ............................ 65/102; 65/160; 65/314; 65/317; 65/357; 65/359

(58) Field of Classification Search ................. 65/29.1, 65/102, 322, 160, 29.12, 64, 305, 306, 307, 65/308, 309, 310, 311, 312, 313, 314, 317, 65/318, 357, 359; 425/810, 136, 398
See application file for complete search history.

(56) References Cited

U.S. PATENT DOCUMENTS

| | | | | |
|---|---|---|---|---|
| 4,459,147 A | * | 7/1984 | Messina et al. ............... | 65/322 |
| 4,923,661 A | * | 5/1990 | Russo ......................... | 264/119 |
| 5,002,479 A | * | 3/1991 | Brown et al. ................ | 425/398 |
| 5,264,016 A | * | 11/1993 | Komiyama ................... | 65/29.1 |
| 5,346,522 A | * | 9/1994 | Komiyama et al. ............. | 65/64 |
| 5,938,807 A | * | 8/1999 | Komiyama et al. ......... | 65/29.12 |
| 6,200,122 B1 | * | 3/2001 | Chun et al. .................. | 425/136 |
| 7,108,812 B2 | * | 9/2006 | Hosoe .......................... | 264/2.5 |
| 2004/0156947 A1 | * | 8/2004 | Hada et al. .................. | 425/810 |

FOREIGN PATENT DOCUMENTS

| | | |
|---|---|---|
| JP | 3-265527 | 11/1991 |
| JP | 05-301727 | 11/1993 |
| JP | 6-16432 | 1/1994 |
| JP | 7-6242 | 1/1995 |

* cited by examiner

Primary Examiner—Steven P. Griffin
Assistant Examiner—DeMaris R. Wilson
(74) Attorney, Agent, or Firm—Manabu Kanesaka

(57) ABSTRACT

A press molding apparatus includes upper and lower molding dies each having a molding surface facing each other, and a driving device which moves at least one of the upper and lower molding dies in a vertical direction so that the upper and lower molding dies are opened and closed. The driving device includes a main shaft which supports the at least one of the upper and lower molding dies, an ascending and descending member which, while supporting the main shaft, ascends and descends, a plurality of screw shafts which is located eccentrically from an axis line of the main shaft, and engages a plurality of screws formed in the ascending and descending member in order to move up and down the ascending and descending member, a driver which synchronously rotates each of the screw shafts, and a controller which controls the driver.

7 Claims, 6 Drawing Sheets

PRESS MOLDING APPARATUS AND PRESS MOLDING METHOD OF OPTICAL ELEMENT

BACKGROUND OF THE INVENTION

1. Field of the Invention

The present invention relates to a press molding apparatus which, by having supply of a material such as a glass preform between a pair of openable/closable molding dies and by closing the molding dies to pressurize the material, forms a molded article having a predetermined shape, and also relates to a press molding method of an optical element using this press molding apparatus.

2. Description of the Related Art

A press molding apparatus is known which has a pair of openable/closable molding dies which, having supply of a material between the molding dies, closes the molding dies to form a molded article having a predetermined shape. It is known that such a press molding apparatus is used to mold optical elements such as a lens, and a heated and softened material is supplied between a pair of upper and lower molding dies, and then the pair of molding dies is moved in such a direction that they approach each other to achieve molding (e.g., refer to Japanese Patent Publication Laid-open No. 6-16432 as Patent Document 1).

Methods of lifting the lower die to bring the pair of upper and lower molding dies into proximity include lifting the lower die by a screw shaft (e.g., refer to Japanese Utility Model Publication Laid-open No. 7-6242 as Patent Document 2), or lifting the lower die by a cylinder (e.g., refer to Japanese Patent Publication Laid-open No. 3-265527 as Patent Document 3).

A technique described in Patent Document 2 has an advantage in that since a main shaft and the screw shaft are on the same axis line, the main shaft is not easily tilted and molding accuracy can be improved.

However, since the screw shaft is disposed on the same axis line as that of the main shaft, as the stroke in the lifting/lowering of the molding die becomes longer, the vertical height of an apparatus in which the length of the screw shaft is added to the main shaft becomes greater, which poses a problem of an increased size of the apparatus and lower workability.

Another problem of the technique described in Patent Document 2 is that as the stroke in lifting/lowering of the molding die becomes longer, deflection of the screw shaft is increased due to buckling load that acts in the axis line direction during molding, which has an adverse effect on the molding accuracy. In other words, the above-mentioned buckling load causes horizontal displacement (shift) in position or angular displacement (inclination, tilt) between molding surfaces of the pair of molding dies, which decreases the molding accuracy.

Furthermore, an advantage of the technique described in Patent Document 3 is that because driving force or pressurizing force during molding is transmitted in point contact state with a center on a lower surface of a holding shaft, for example, as shown in FIG. 2 of Patent Document 3, unnecessary moment in a diametrical direction of the shaft does not function during molding, making it possible to reduce the inclination of the holding shaft.

However, this technique also has the problem of the increased size of the apparatus and lower workability if a driver is provided immediately under the holding shaft as shown in FIG. 3 of Patent Document 3. Another problem is that, if the driver and a screw driving shaft are located eccentrically from the holding shaft to reduce the size of the apparatus as shown in FIG. 1 and FIG. 2 of Patent Document 3, the holding shaft is tilted by the moment produced between the holding shaft and the screw driving shaft, thus decreasing the molding accuracy.

The present inventors have continued research to solve the problems described above. First, in order to solve the problem caused by disposing the screw shaft of the lower die on the same axis line as that of the main shaft, a press molding apparatus shown in FIG. 6 is experimentally produced in which the main shaft and the screw shaft of the lower die are eccentrically disposed, and then various considerations have been made.

A press molding apparatus 300 shown in FIG. 6 comprises a molding section 320 where a pair of upper and lower molding dies 322, 323 is provided in a molding chamber 321, and a driving section 330 which lifts/lowers a main shaft 324 supporting the lower molding die 323 in a vertical direction.

The driving section 330 has a servo motor M, a screw shaft 333 which is driven and rotated by the servo motor M, and an ascending/descending member 332 which is attached to a lower end of the main shaft 324 and which comprises a nut 332a constructing a ball screw/nut mechanism together with the screw shaft 333.

Furthermore, the driving section 330 has a guide 334 which comprises a support member 334a attached to a base cabinet 331, a guide rail 334b provided in the support member 334a in the vertical direction, and a fitting groove 332b of the ascending/descending member 332 into which the guide rail 334b is fitted in.

In such a configuration, if the servo motor M is driven to rotate the screw shaft 333, this rotation is converted to vertical movement parallel to the axis line of the main shaft 324 by the nut 332a of the ascending/descending member 332, and the main shaft 324 and the molding die 323 ascend/descend in the vertical direction as guided by the guide 334.

The press molding apparatus shown in FIG. 6 provides an advantage that the vertical height of the apparatus can be reduced to enable reduced size of the apparatus and better workability. On the other hand, in the driving section 330 as shown in the drawing, another problem has been found that the screw shaft 333 is located eccentrically with respect to the main shaft 324, so that if load during the press molding of a material functions in a direction indicated by an arrow I in the drawing, force in an arrow II direction acting on the screw shaft 333 tilts the ascending/descending member 332, and the molding die 323 thus tilts together with the main shaft 324.

If the main shaft 324 and the molding die 323 tilt, contact surfaces of the upper and lower molding dies 322, 323 lose horizontalness. This means lower fitting accuracy of the upper and lower molding dies 322, 323. More specifically, central axes of the molding surfaces of the pair of molding dies 322, 323 cause angular displacement (tilt), resulting in lower eccentric accuracy of the molded optical elements. A further problem is that if positioning members (e.g., sleeves and guide pins) of the upper and lower molding dies 322, 323 are provided in such a manner to protrude from the contact surfaces of the upper and lower molding dies 322, 323, the molding dies 322, 323 cause scuffing and gnawing every time they are opened or closed. To prevent this, if a fitting clearance is increased, this results in further horizontal displacement (discenter) of the upper and lower molding dies 322, 323 to impair the eccentric accuracy of the molded optical elements.

Meanwhile, due to an increase in the number of pixels of digital cameras or an increase in recording density of optical recording media such as DVDs, higher accuracy has recently been demanded in the optical elements used for such optical equipment. Especially, as one central axis (connecting the center of an aspheric surface to the center of curvature of the aspheric surface) is defined by one molding surface shape in the molding of an aspheric lens, it is required that the central axes of the upper and lower molding surfaces coincide, and mutual positional accuracy of the pair of molding surfaces is significantly important.

For example, it is requested that these optical elements are molded on a condition that tilt is within 2 arcminutes. It is, however, not easy to perform continuous pressing a number of times while always controlling the tilt within a predetermined range.

The present inventors have analyzed factors that deteriorate the tilt, and found out that there is room for improvement in a driving mechanism associated with the lifting and lowering of the molding die, and further continued research in consideration to the problems caused in the press molding apparatus shown in FIG. 6. As a result, it is found out that the above problem can be solved by employing a configuration in which the main shaft supporting the molding die is lifted/lowered by a plurality of screw shafts located eccentrically with respect to the main shaft.

Therefore, an object of the present invention is to provide the driving section that opens and closes the molding dies with a configuration which does not produce eccentric molded articles such as optical elements to improve the molding accuracy. Another object is to provide a molding apparatus and a molding method which prevent the size increase of the apparatus and lower workability without tilting the main shaft along which the movable molding die moves.

A further object is to provide a press molding apparatus and a press molding method wherein, when the molding dies are replaced or checked in a non-operated state or when a material is supplied in an operated state, the upper and lower molding dies need to be opened sufficiently for carrying means to go in and out of a space between the molding dies to carry out a molded optical element, but the press molding apparatus can be relatively small in size even if the opening between the molding dies is sufficiently large as above.

SUMMARY OF THE INVENTION

In order to achieve the objects described above, the present invention provides a press molding apparatus which has openable/closable upper and lower molding dies having opposite molding surfaces and which has a driving section that moves at least one of the upper and lower molding dies in a vertical direction to open or close the molding dies, and the driving section comprises a main shaft which supports the movable molding die; an ascending/descending member which supports the main shaft and which ascends and descends; a plurality of screw shafts which are located eccentrically from an axis line of the main shaft and which engage with a plurality of screws formed in the ascending/descending member to lift and lower the ascending/descending member; drivers which synchronously rotate the respective screw shafts; and a controller which controls driving of the drivers.

According to this configuration, the main shaft does not tilt due to moment, and the ascending/descending member can ascend and descend accurately in the vertical direction. Further, as each of the screw shafts is rotated by the driver, an adverse effect due to a pitch error or the like of each screw shaft is corrected for each screw shaft, thereby enabling the material to be accurately press-molded.

In the configuration of the present invention, the plurality of screws in the ascending/descending member is provided symmetrically with respect to the main shaft. Thus, loads acting on the plurality of screw shafts can be equalized so that the ascending/descending member is kept horizontal, and load control can be easily performed in press molding, so that the molding dies can be kept highly accurately horizontal. Moreover, even if deflection is caused depending on the rigidity and thickness of the ascending/descending member, the ascending/descending member does not tilt because the screws are located symmetrically with respect to the main shaft, thus keeping the main shaft horizontal.

Furthermore, as described according to the present invention, the plurality of screw shafts is preferably configured so as to be equally subjected to the loads when the molding dies are closed for press molding. The press loads are thus exerted equally on the plurality of screw shafts, thereby making it possible to prevent the main shaft from tilting and to maintain the molding dies highly accurately horizontal.

Furthermore, as described according to the present invention, the driver may be provided for each of the plurality of screw shafts, and the driving of each driver may be controlled by the controller. This is advantageous in that application is possible even when high torque (load) is required and the most accurate synchronism can be secured.

In this case, as described according to the present invention, the controller preferably performs positional control to control the moving position of the ascending/descending member by the rotation of the plurality of screw shafts when the molding material is molded.

According to this configuration, the dies can be closed while the molding dies are highly accurately kept horizontal by the positional control.

The present invention provides a press molding method of an optical element using a press molding apparatus, and the method comprises the steps of preheating the molding dies to a predetermined temperature; carrying a heated and softened material to supply the material to the lower molding die of the opened molding dies; and press-molding the material by closing the molding dies, wherein in the press-molding step, the position of the molding die is controlled by rotation of a plurality of screw shafts.

According to these methods, optical elements such as lenses can be molded with high molding accuracy.

DETAILED DESCRIPTION OF THE PREFERRED EMBODIMENTS

EMBODIMENTS OF THE INVENTION

Preferred embodiments of the present invention will hereinafter be described in reference to the drawings.

Figure 1:
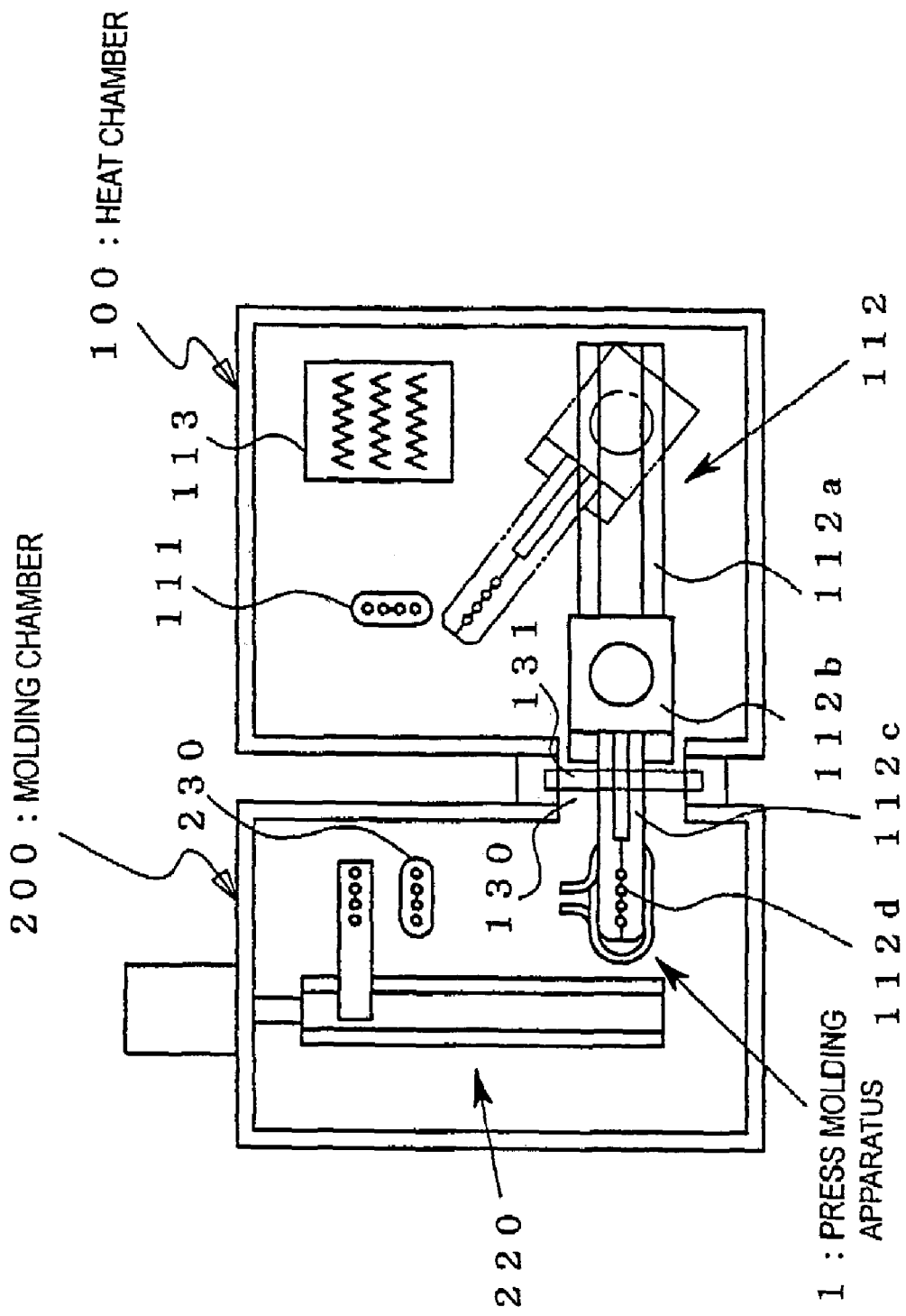
FIG. 1 is a schematic sectional plan view of an apparatus of manufacturing a glass optical element when a press molding apparatus of the present invention is applied to the apparatus of manufacturing the glass optical element.

FIG. 1 is a schematic sectional plan view of an apparatus of manufacturing a glass optical element when a press molding apparatus of the present invention is applied to the apparatus of manufacturing the glass optical element.

The manufacturing apparatus shown in FIG. 1 presses a spherical glass preform (a molding material), and manufactures a small collimator lens.

As shown in FIG. 1, the apparatus of manufacturing the glass optical element comprises a heat chamber 100, and a molding chamber 200 provided adjacently to the heat chamber 100. The heat chamber 100 is in communication with the molding chamber 200 through a passage 130 comprising an open/close valve 131, and the heat chamber 100, the molding chamber 200 and the passage 130 form one sealed space shut off from the outside. An outer wall of this sealed space is formed of a member of stainless steel or the like, and it is kept airtight by a sealing member. The sealed space formed by the heat chamber 100, the molding chamber 200 and the passage 130 is filled with an inert gas atmosphere when the glass optical element is molded.

The heat chamber 100 is an area to preheat the supplied glass preform before pressing, and is equipped with preform supplying means 111 for supplying the glass preform from the outside of the heat chamber 100 into the heat chamber 100, preform carrying means 112 for carrying the glass preform from the preform supplying means 111 to the molding chamber 200, and preform heating means 113 for preheating the glass preform to be carried to the molding chamber 200.

The preform carrying means 112 is provided in the heat chamber 100, and receives the glass preform supplied from the preform supplying means 111, and carries it to a heating area provided with the preform heating means 113, and further carries the heated and softened glass preform to the molding chamber 200. The preform carrying means 112 comprises four plates 112d at an end of its arm 112c, and holds the glass preform thereon.

In a configuration of the embodiment, a driving table 112b which moves on a slide portion 112a fixed in the heat chamber 100 horizontally bears the arm 112c comprising the plates 112d, and the arm 112c horizontally pivots with a rotation angle of about 90 degrees.

The preform carrying means 112 comprises an unshown arm open/close mechanism inside the driving table 112b, thereby opening the end of the arm 112c to drop the glass preform on the plates 112d onto a molding die.

If the surface of the glass causes a defect by contacting a carrying jig when the glass preform is carried in a preheated and softened state, shape accuracy of the molded optical element lowers. Therefore, the arm 112c of the present embodiment is made as a floating conveyance type which conveys the glass preform in a state floating on gas.

Furthermore, for example, the arm 112c is preferably constituted of a pair of arm divided members which can divide in its width direction, and an end side of the arm divided members is opened such that the glass preform on the plates 112d is dropped and supplied onto the molding die from the opening.

The preform heating means 113 heats the supplied glass preform to a temperature corresponding to a predetermined viscosity. The preform heating means 113 is generally U-shaped in a side view, and comprises heaters on its interior upper and lower surfaces. The preform heating means 113 is placed on a moving path of the glass preform held on the plates 112d.

In this manufacturing apparatus, the surface temperature of the heaters of the preform heating means 113 is preferably about 1100° C., and a furnace atmosphere, that is, the atmosphere between the upper and lower heaters is preferably about 700 to 800° C. It is to be noted that in the present embodiment, a temperature difference is provided between the upper and lower heaters to prevent warping in a vertical direction of the arm 112c.

On the other hand, the molding chamber 200 is equipped with a press molding apparatus 1 which presses the glass preform preheated in the heat chamber 100 to mold a glass optical element having a desired shape, and carry-out means 220 which comprises a suction pad and which automatically takes out the molded optical element from the press molding apparatus 1 to carry it to element take-out means 230.

The element take-out means 230 carries out the press-molded glass optical element to the outside of the molding chamber 200.

Figure 2:
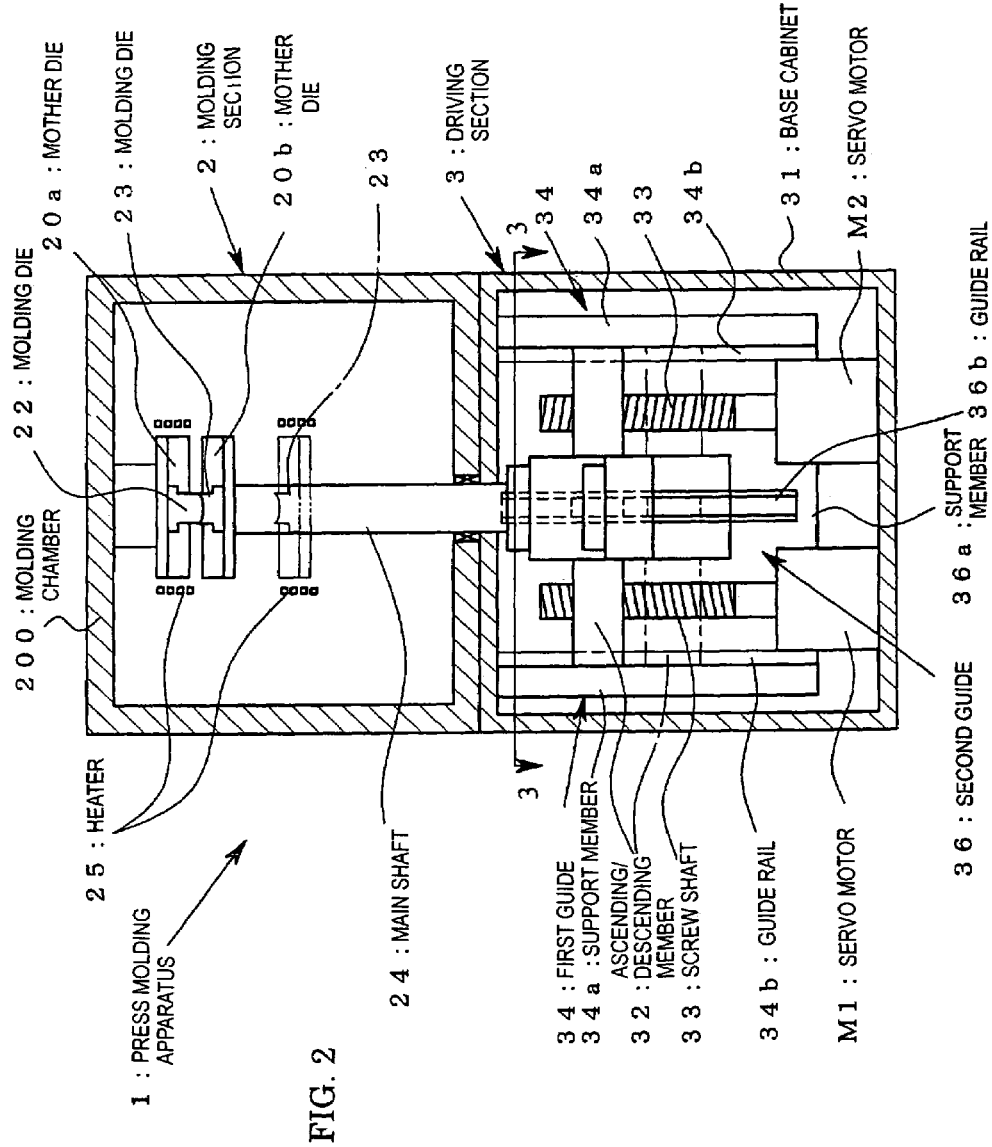
FIG. 2 is a sectional side view explaining a schematic configuration of the press molding apparatus of the present invention.
Figure 3:
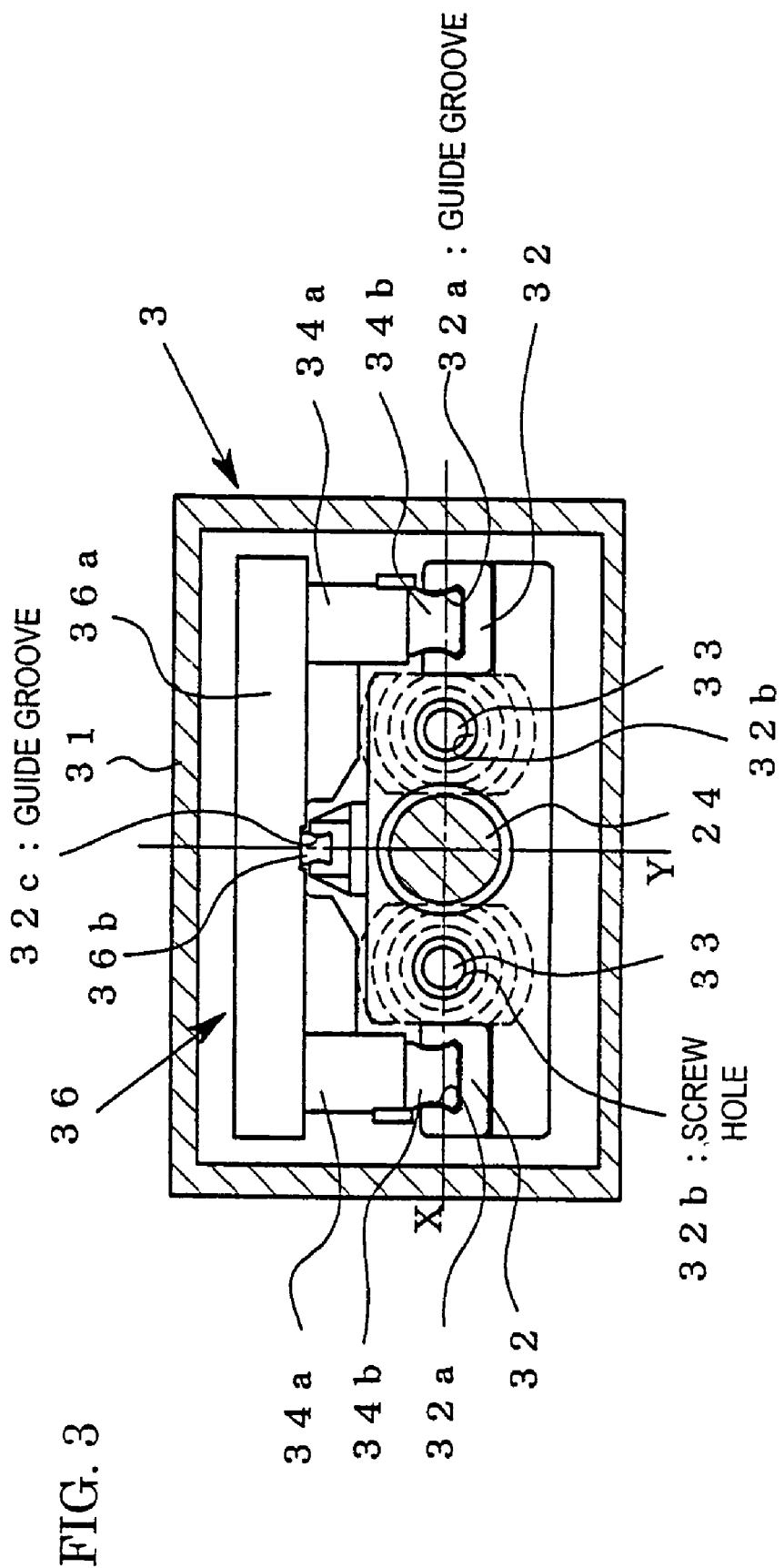
FIG. 3 is a sectional view taken along line 3-3 in FIG. 2.

FIG. 2 and FIG. 3 are diagrams showing details of the press molding apparatus provided in manufacturing apparatus described above, and FIG. 2 is a sectional side view explaining its schematic configuration and FIG. 3 is a sectional view taken along line 3-3 of FIG. 2.

The press molding apparatus 1 comprises a molding section 2 to press-mold the glass preform, and a driving section 3 which is provided under the molding section 2 and which lifts or lowers a lower molding die 23 of a pair of upper and lower molding dies 22, 23 in the molding section 2.

The molding section 2 has the molding chamber 200 in communication via the passage 130 with the heat chamber 100 (see FIG. 1) to heat the glass preform, and the pair of upper and lower molding dies 22, 23 provided in the molding chamber 200. The upper molding die 22 is fixed to a ceiling portion of the molding chamber 200, and the lower molding die 23 is attached to an upper end of a main shaft 24 which ascends and descends in a vertical direction.

The number of optical elements molded by press molding in one cycle may be one or plural. Any number of molding dies 22, 23 may be disposed on mother dies 20a, 20b in accordance with the number of optical elements, but if the area of the mother dies 20a, 20b increases, molding accuracy decreases from the effect of warping caused by thermal deformation due to high temperature during pressing. Especially in the molding dies 22, 23 disposed in the vicinity of ends of the mother dies 20a, 20b, eccentric accuracy lowers due to vertical axial displacement. Moreover, low fitting accuracy of the upper and lower molding dies 22, 23 causes gnawing and scuffing of positioning members. Further, if a clearance between the positioning members is increased to solve these problems, eccentric accuracy decreases. Therefore, the number of molding dies 22, 23 is preferably selected such that tilting (here referred to as molding tilt) of central axes of molding surfaces in the upper and lower molding dies 22, 23 will be within 2 arcminutes in the optical element molded by all the molding dies 22, 23 on the mother dies 20a, 20b. Depending on the material of the mother dies 20a, 20b, the size of the molding dies 22, 23 and arrangement spacing, the number of molding dies 22, 23 disposed on one mother die 20a, 20b is preferably one to four.

The amount of molding tilt can be obtained, for example, by using the upper and lower molding dies 22, 23 having flat portions at peripheral edges to press-mold an optical element (lens) having a flanged flat portion at a peripheral edge and by measuring the angles of the flat portions of a first surface and a second surface of the molded optical element. It may also be obtained from the angles of the upper and lower molding dies 22, 23 of the press molding apparatus 1. The material of the mother dies 20a, 20b is preferably heat resistant. Moreover, when heat conduction from the mother dies 20a, 20b is utilized as a mechanism to heat the molding dies 22, 23, the material of the mother dies 20a, 20b can be a material (mainly a metal such as iron, cobalt or nickel) which can induce high frequency to use a high frequency inducing coil as heating means of the mother dies 20a, 20b. When a ceramic material is used for the molding dies 22, 23, for example, a tungsten alloy is preferably used which has an approximate coefficient of thermal expansion.

The glass preform carried into the molding chamber 200 from the heat chamber 100 through the passage 130 (see FIG. 1) is carried to the space between the opened upper and lower molding dies 22, 23 and supplied on the lower molding die 23. Then, the lower molding die 23 rises together with the main shaft 24 to close the dies, thereby performing the press molding of the glass preform.

In the drawing, a numeral 25 denotes heaters to heat the molding dies 22, 23 to a predetermined temperature and coils for induction heating before the press molding, and they are provided on a periphery of the upper molding die 22 and on an ascending/descending path of the lower molding die 23.

Here, the material and sectional shape of an ascending/descending member 32 are preferably highly rigid and do not easily deflect even if a load acts on the main shaft 24. For the material, it is preferable to use, for example, carbon steel or rolled steel which is steel for machine structural use defined by JIS, or ceramics. Such an ascending/descending member 32 can be used to increase the molding accuracy of molded articles.

The main shaft 24 extends into the driving section 3 through a through formed in a floor of the molding chamber 200. The driving section 3 has a base cabinet 31, two servo motors M1, M2 as drivers attached to a bottom of the base cabinet 31, a pair of right and left screw shafts 33, 33 which are linked to driving shafts of the servo motors M1, M2 and which are driven and rotated by the servo motors M1, M2, the ascending/descending member 32 which is attached to a lower end of the main shaft 24 and which engages with the screw shafts 33, 33 and in which screw holes 32b, 32b (see FIG. 3) are formed to construct a ball screw/nut mechanism together with the screw shafts 33, 33, first guides 34, 34 which guide the ascending/descending member 32 from both sides, and a second guide 36 which guides the ascending/descending member 32 from a rear side.

The pair of right and left screw shafts 33, 33 is disposed at positions eccentric from the center of the main shaft 24, which is not only positions different from the axis line of the main shaft 24 but also symmetrical positions opposite at 180 degrees with respect to the main shaft 24 (positions on the same line (X) in FIG. 3).

The ascending/descending member 32 is formed of a highly rigid material, so that even if a load acts in an axis line direction during the press molding of the glass preform, the screw shafts 33, 33 are only subjected to loads that are equal to each other in the vertical direction, and the ascending/descending member 32 is always kept horizontal and the main shaft 24 does not tilt.

The ascending/descending member 32 can be kept horizontal even when the screw shafts 33, 33 are not arranged symmetrically with respect to the main shaft 24, but the loads acting on the screw shafts 33, 33 are different, resulting in complicated control. Further, the main shaft 24 does not tilt even if the ascending/descending member 32 deflects so that they are preferably arranged symmetrically.

The screw shafts 33, 33 described above have their upper ends rotatably supported by bearings or the like in an upper part of the base cabinet 31, and their lower ends linked to the driving shafts of the servo motors M1, M2.

The first guides 34, 34 guiding both sides of the ascending/descending member 32 comprise a pair of right and left support members 34a, 34a provided to hang from a ceiling portion of the base cabinet 31 in a vertical direction, guide rails 34b, 34b laid in the vertical direction at ends of the support members 34a, 34a, and guide grooves 32a, 32a (see FIG. 3) which are formed in the ascending/descending member 32 and into which the guide rails 34b, 34b are fitted.

Furthermore, the second guide 36 which guides the ascending/descending member 32 from the rear side comprises a support member 36a provided to hang from the ceiling portion of the base cabinet 31 in the vertical direction, a vertical guide rail 36b which is laid substantially in the center of the support member 36a and which is provided on an axis line Y perpendicular to an axis line X and passing the center of the main shaft 24, and a guide groove 32c (see FIG. 3) which is formed in the ascending/descending member 32 and into which the guide rail 36b is fitted. The support member 36a and the support members 34a, 34a are preferably formed integrally as shown in FIG. 3 to increase their rigidity.

Moreover, linear guides with high guiding accuracy are preferably used for the first guides 34, 34 and the second guide 36.

The servo motors M1, M2 are driven under the control of a controller.

Figure 4:
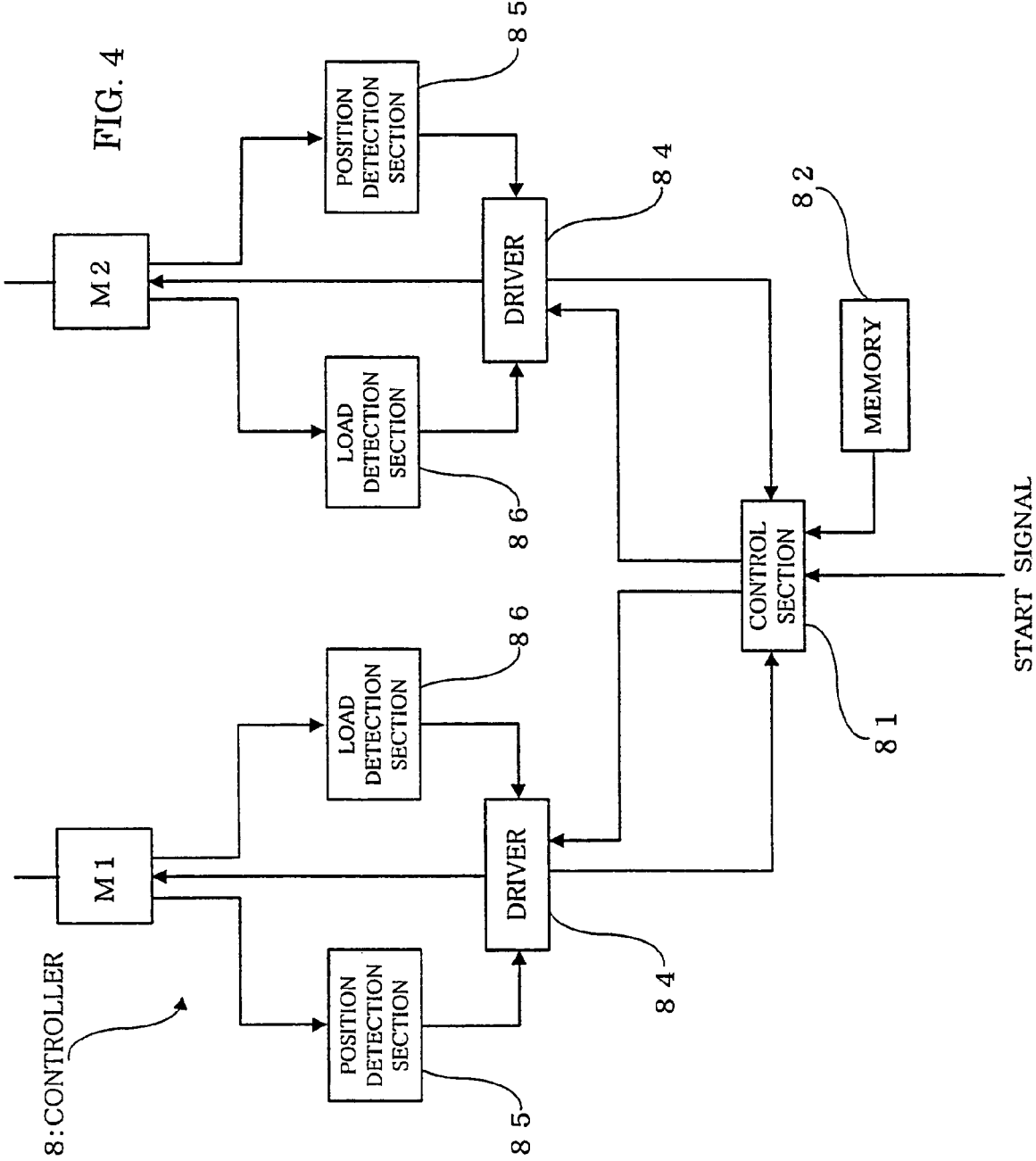
FIG. 4 is a block diagram explaining a configuration of a controller which controls driving of servo motors M1, M2.

FIG. 4 is a block diagram explaining a configuration of the controller which controls the driving of the servo motors M1, M2.

The controller has a memory 82 which stores various preset conditions, a control section 81 which controls the servo motors M1, M2 so that an operation based on the set conditions is performed, drivers 84, 84 which drive the servo motors M1, M2 in accordance with a driving instruction from the control section 81, position detecting sections 85, 85 which detect the rotation angles of the screw shafts 33, 33, and load detecting sections 86, 86 which detect, via the servo motors M1, M2, loads (also referred to as torque) acting on the screw shafts 33, 33.

The control section 81 can issue driving instructions (target value signal) at a predetermined period to control the servo motors M1, M2.

Known encoders can be used for the position detecting sections 85, 85 which detect the rotation angles of the screw shafts 33, 33. The encoder outputs a detection signal corresponding to the rotation angle of the screw shaft 33. As shown in the drawing, a controller 8 in this embodiment inputs, to the drivers 84, 84, detection signals associated with the rotation angles detected by the position detecting sections 85, 85. Further, information on a driving state is always input from the drivers 84, 84 to the control section 81.

The drivers 84, 84 use the detection signals associated with the rotation angles as feedback signals, and perform feedback control so that a detected value corresponds to a target value. The detection signals are preferably detected at intervals as short as possible, for example, at intervals of several ms. This makes it possible to synchronize the rotations of the screw shafts 33, 33 highly accurately and to keep the ascending/descending member 32 horizontal with high accuracy.

Furthermore, the information input from the drivers 84, 84 to the control section 81 is compared in the control section 81, and the driving instructions are output to the drivers 84, 84 so that rotational positions (i.e., the rotation angles of the screw shafts 33, 33) of the servo motors M1, M2 driven by the drivers 84, 84 will be substantially the same. It is to be noted that the position of the ascending/descending member 32 or the molding die 23 may be detected by an unshown optical sensor, and a signal thereof may be input to the control section.

Still further, the load detecting sections 86, 86 to be used can be such that an increase or decrease of the load is detected from the relation between the amount of current supplied to the motors and the rotation speed of the motors, for example. As shown in the drawing, the detection signals associated with the loads acting on the screw shafts 33, 33 detected by the load detecting sections 86, 86 are input to the drivers 84, 84 and the control section 81, and when the loads exceed a predetermined load, a torque limiter operates so that the drivers 84, 84 can control the loads to prevent excessive loads from being applied to the motors M1, M2.

Furthermore, the control section 81 compares to ascertain whether or not the position of the ascending/descending member 32 calculated on the basis of the information from the drivers 84, 84 has reached a position preset in the memory 82, and judges whether or not closing of the dies has completed. Then, the control section 81 issues an instruction for the drivers 84, 84 to stop driving the motors M1, M2 when confirming that the closing has completed.

It is to be noted that when the operation of the press molding apparatus of the present invention is controlled by the control section 81, a changeover may be performed from the positional control to the load control after the positional control is performed until the upper and lower molding dies 22, 23 reach the predetermined position while the glass preform supplied between the upper and lower molding dies 22, 23 is being press-molded. That is, the positional control is performed until one molding die (here, the lower die 23) is brought in proximity to the predetermined position so as to keep horizontal with respect to the other molding die (the upper die 22) by synchronously rotating the screw shafts 33, 33 without tilting the main shaft 24 after the start of molding.

Subsequently, a changeover is made to the load control such that the control section 81 controls the load applied across the upper and lower molding dies 22, 23 or the press load detected by press load detecting means. In performing this load control, the servo motors M1, M2 are driven until a preset load value (e.g., 10 MPa) is reached.

It is to be noted that the value may be set on multistage over time. Thus, the positional control and the load control are combined to control the press molding apparatus such that surface accuracy and thickness accuracy of the molded optical element can be increased, which is beneficial to the molding of concave meniscuses and double-concave lenses which are difficult to mold.

The steps of press molding using the apparatus described above are performed, for example, as follows.

(a) Die Heating Step

Before the press molding, the upper and lower mother dies 20a, 20b are heated to a predetermined temperature by heating means 25, 25, preferably by high frequency inducing heating coils to heat the upper and lower molding dies 22, 23. In the case of continuous molding, since the upper and lower molding dies 22, 23 have been cooled off to a temperature near Tg (glass transition temperature) in a take-out step during previous molding, they are heated to a predetermined temperature for the next molding. The temperature of the upper and lower molding dies 22, 23 can be a temperature corresponding to a viscosity of the glass preform of $10^8$ to $10^{12}$, preferably $10^8$ to $10^{10}$ poises.

(B) Supply Step

The preheated glass preform is carried between the heated upper and lower mother dies 20a, 20b, and dropped, supplied and disposed on the lower molding die 23. In the supply step, the glass preform heated to a suitable temperature is supplied which has been preformed into a predetermined shape having proper weight. It is preferable to supply a glass material which has been preheated to a temperature higher than the set temperature of the dies to be in a softened state suitable for molding (so called non-isothermal pressing), in which case it is required that the temperature of the dies should be especially controlled precisely. This can shorten molding cycle time to improve manufacturing efficiency.

The temperature of the glass material at this point can be a temperature corresponding to a viscosity below $10^{10}$, preferably below $10^9$, more specifically a temperature corresponding to $10^6$ to $10^{8.5}$ poises. However, when phosphate glass, borate glass or glass having a refractive index nd of 1.7 or higher is used as the glass material as described later, a relatively low temperature is preferable which corresponds to $10^{7.5}$ to $10^9$ poises. Moreover, the temperature of the glass material is preferably higher than the temperature of the upper and lower molding dies 22, 23.

When the heated and softened glass material is carried and disposed on the lower molding die 23, if the glass material contacts a carrying member to cause a defect on the surface, it will affect the surface shape of the molded optical element, so that it is preferable to use carrying means for carrying the softened glass material in a state floating on the gas in a manner described above and dropping the glass material onto the lower molding die 23. Subsequently, the following pressing step is performed.

(c) Pressing Step

As soon as the glass material is supplied, the servo motors M1, M2 which are driving means at the lower mother die 20b are actuated to lift the lower mother die 20b with the positional control, and the lower mother die 20b is pressurized onto the upper mother die 20a, and then the molding surfaces of the upper and lower molding dies 22, 23 are transferred to the glass preform, thereby forming a glass mold having a predetermined surface shape. In the meanwhile, because the upper mother die 20a is fixed to the ceiling portion of the molding chamber 200, reactive force of molding load is applied to the main shaft 24 via the lower mother die 20b, and further loads are applied to the ascending/descending member 32 and the servo motors M1, M2 via the screw shafts 33, 33. The loads of the servo motors M1, M2 are detected by the load detecting sections 86, 86, and if a detected value thereof is beyond a predetermined value (e.g., 400 kgf/cm$^2$), the torque limiter provided in the drivers 84, 84 or the control section 81 is actuated to stop the driving of the servo motors M1, M2.

(d) Cooling and Releasing Step

Simultaneously with or after the pressing step, the cooling of the molding dies 22, 23 is started. That is, the molded optical element is maintained in close contact with the molding dies 22, 23 while the position is controlled to maintain the pressure or while the pressure is being decreased, and they are cooled off to a temperature below the temperature corresponding to a viscosity of the glass of $10^{12}$ poises, and then the lower mother die 20b is lowered to separate the upper and lower molding dies 22, 23, thereby releasing the dies. The releasing is preferably performed at a temperature corresponding to $10^{12.5}$ to $10^{13.5}$ poises.

(e) Take-Out Step

The molded optical element is automatically taken out by the carrying means comprising a suction member.

Figure 5:
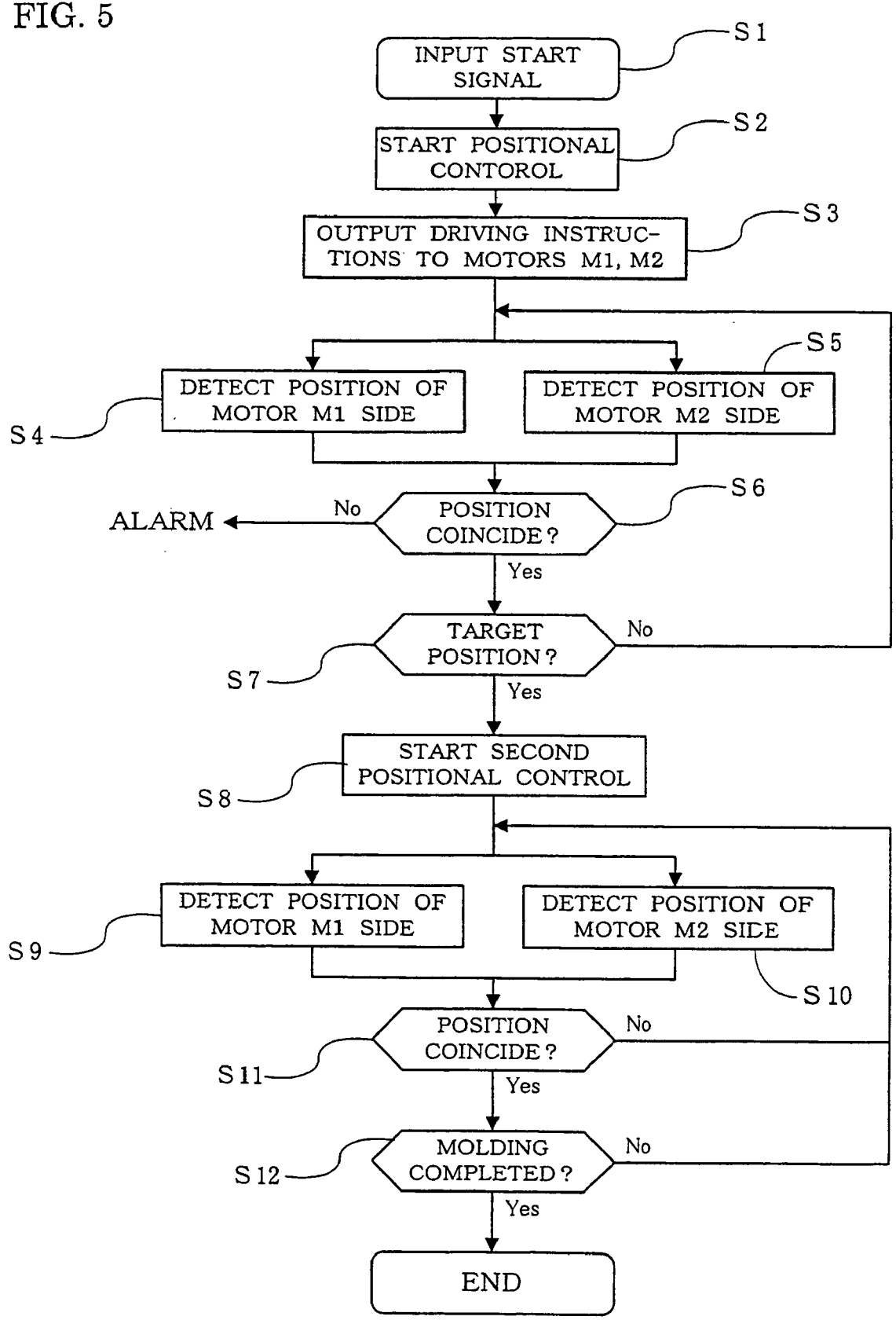
FIG. 5 is a flowchart explaining a function of the press apparatus in this embodiment.
Figure 6:
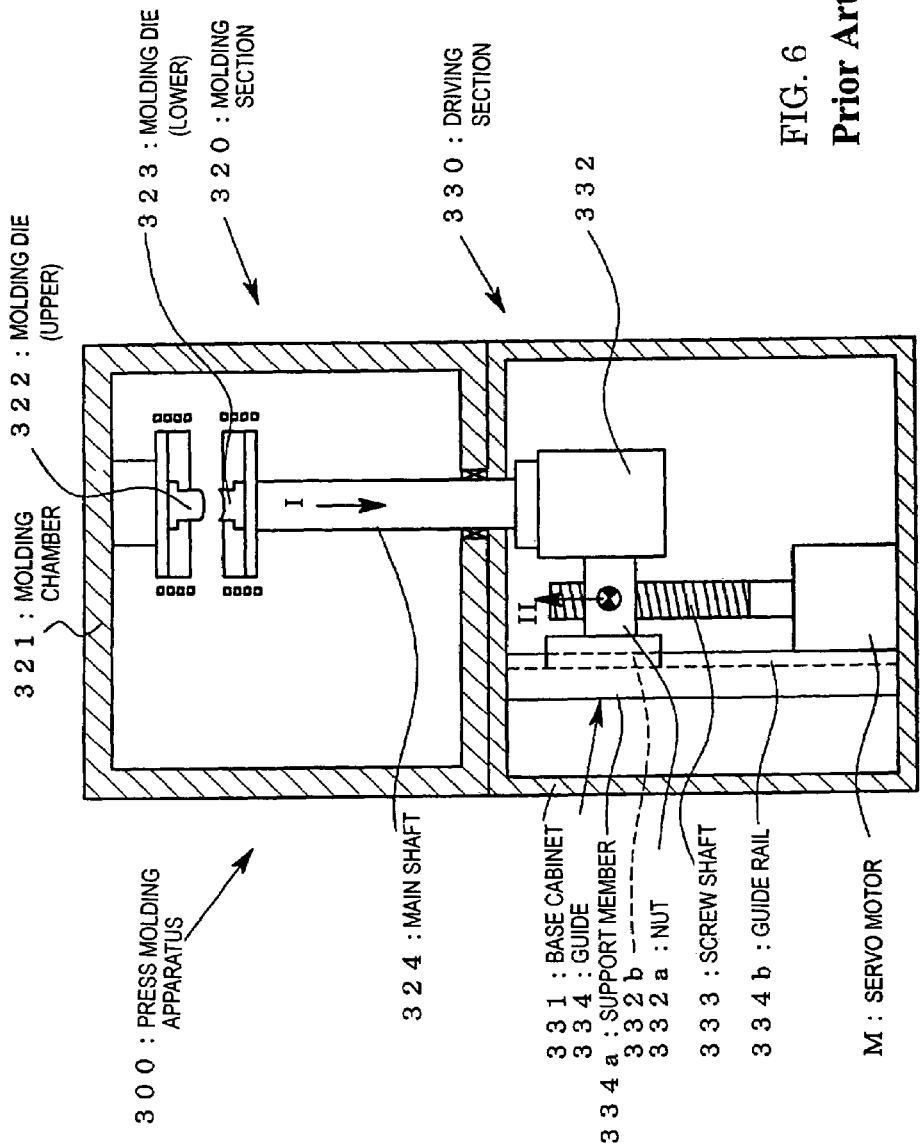
FIG. 6 is a diagram showing a schematic configuration of a referential press molding apparatus.

FIG. 5 is a flowchart explaining a control procedure in the pressing step.

When the glass preform is supplied to the lower molding die 23 and a start signal to start molding is input to the control section 81 (step S1), the control section 81 starts the positional control (step S2), and outputs drive instruction signals (target value signals) to synchronously drive the servo motors M1, M2, to the drivers 84, 84 at a predetermined period (step S3).

The position on the side of the servo motor M1 and the position on the side of the servo motor M2 are detected by position detecting means simultaneously with the driving of the servo motors M1, M2 (steps S4, S5), and position detection signals are input to the drivers 84, 84. In this case, information on the driving state of the servo motors M1, M2 is always input to the control section 81, and the control section 81 outputs the drive instruction signals to the drivers 84, 84 so that the rotational positions of the motors M1, M2 will substantially coincide (synchronize) (step S6). The drivers 84, 84 to which the drive instruction has been input generate drive current on the basis of a difference between the position detection signals and the drive instruction signals to drive the servo motors M1, M2. Thus, the ascending/descending member 32 is kept horizontal, that is, the lower molding die 23 is kept horizontal.

When the rotation angles of the right and left screw shafts 33, 33 do not coincide in the process of ascending (step S6), an alarm is output in accordance with a judgment that abnormalities have occurred, and the servo motors M1, M2 are stopped. When the rotation angles of the right and left screw shafts 33, 33 coincide, the ascending height (current position) of the ascending/descending member 32 is judged from the rotation angles of the screw shafts 33, 33, and it is compared with the position preset in the memory 82 to judge whether the target position has been reached (step S7).

It is to be noted that a predetermined position where the glass preform supplied to the lower molding die 23 contacts the upper molding die 22 or where the ascending/descending member 32 further ascends after contacting can be set as the target position. Preferably, the target position is a predetermined position where the glass preform (mold) has a predetermined thickness after the ascending/descending member 32 has ascended and the glass preform has started to deform due to the rising of the lower molding die 23.

The target position is properly decided depending on the shape of the lens to be molded and the composition of the material to be used. For example, initial pressurization is performed to largely deform the material into a shape approximate to a final shape, and the molding dies 22, 23 are cooled off simultaneously with or after the initial pressurization, and then pressurization is performed again (second pressurization) to correct the surface shape of the mold, in which case the target position can be the position where the initial pressurization is finished.

When it is judged that the ascending/descending member 32 has reached the target position (step S7), that is, when it is judged that the initial pressurization is finished, the control section 81 starts second positional control to perform the second pressurization (step S8). In the second pressurization, the positional control is performed so that pressurization force is smaller than that of the initial pressurization. For example, the pressurization force of the second pressurization is set in a range from 5 MPa to 30 MPa (about 50 to 300 kgf/cm$^2$) to have a load of 5 to 70% of that of the initial pressurization.

It is to be noted that a limit value is preferably provided in the torque of the servo motors M1, M2 so that excessive pressurization force and load are not caused similarly in the second pressurization.

Since the cooling of the molding dies 22, 23 is started simultaneously with or after the initial pressurization, a shift from the initial pressurization to the second pressurization is preferably made such that the temperature of the molding dies 22, 23 corresponds to a viscosity of the glass of $10^{10}$ to $10^{13}$ poises. Further, the shift from the initial pressurization to the second pressurization can be made when the lower molding die 23 has reached about 0.1% to 5% before the final thickness of the molded optical element.

After the second pressurization has been started, the positions of the servo motors M1, M2 are detected (steps S9, S10), and detection signals are input to the drivers 84, 84 and the control section 81. The control section 81 judges whether or not the rotational positions during the second pressurization have reached the preset target value, and when they have not reached, the control section 81 outputs an instruction signal to drive the servo motors M1, M2 so that the target value will be reached (step S11).

In this way, the molding dies 22, 23 and the mold are cooled off while the positional control is being continued until the rotation angles of the screw shafts 33, 33 rotated by the servo motors M1, M2 reach a set value in the second pressurization. When the rotation angles of the screw shafts 33, 33 have reached the set value in the second pressurization, the control section 81 stops the driving of the servo motors M1, M2, and judges that the press molding has been finished (step S12).

Subsequently, the molding dies 22, 23 are cooled off to, for example, below a temperature corresponding to a glass viscosity of $10^{12.5}$ to $10^{13.5}$ poises, and the lower molding die 23 is lowered to open the dies in order to take out the mold. Then, steps S1 to S12 are repeated to form the next mold.

Thus, multistage control is useful in molding convex meniscuses, concave meniscuses and double-concave lenses.

According to the press molding method described above, the glass is largely deformed into a shape close to the final shape while the molding dies are kept horizontal (i.e., conformity of upper and lower optical axes of the pair of molding dies) by the positional control. Then, when the glass is in a predetermined viscosity range during cooling, the positional control (velocity control) is performed so that a proper load (such as secondary pressure) is applied again to correct the surface shape, and pressing is performed toward final thickness.

Therefore, optical elements such as the concave meniscuses and double-concave lenses whose shape is difficult to mold easily cause inaccuracy in the surface because the glass non-uniformly contracts during cooling after press molding, but this can be prevented by the press molding method of the present invention.

The material to which the present invention is applied is not particularly limited. The glass preform that can be used includes optical glass comprising phosphate glass, borate glass, silicate glass and borosilicate acid glass. Especially in phosphate glass and borate glass, reactivity is high between the glass and the surfaces of the molding dies, so that the press molding may be performed at a relatively low temperature (i.e., at high viscosity) to prevent fusion. High pressurization force is required in such a case, but as the verticality of the main shaft is maintained in press molding with high pressurization force as compared to prior art, the present invention is particularly suitable for molding of these materials.

Furthermore, for example, in the optical glass having a high refractive index nd of 1.7 or higher, reactivity in the molded surface is high similarly to the above due to a component having a high refractive index (such as W, Nb or Ti) that is added in large quantity. Therefore, even if the pressing is performed at a low temperature and with high pressurization force in the same manner, effects of the present invention can be obviously provided whereby the verticality of the pressing shaft is maintained.

While the preferred embodiments of the present invention have been described, the present invention is not at all limited to the above description.

For example, two screw shafts 33 have been provided at symmetrical positions, but three or more screw shafts may be provided. Again, for example, the screw shafts are arranged with equal spaces on the same circumference around the axis line of the main shaft 24 so that bending moment does not act on the respective screw shafts.

Moreover, the guides are provided on the right and left sides and the rear side of the ascending/descending member 32 in the above embodiments, but the guides may be provided on the right and left sides and the front and rear sides, for example.

Furthermore, the servo motors M1, M2 are provided to the two screw shafts 33, 33, respectively, in the apparatus in the present embodiments described above, but one motor may drive two ball screws. For example, the motor may be linked to the ball screws by a gear. In this case, the rotations of the two ball screws can be easily synchronized. The motor may also be linked to the ball screws by a pulley. Moreover, as long as one of the molding dies can be moved, the driver is not limited to the servo motor, and other types of motors or cylinders may be used.

Still further, after the second pressurization, a multistage pressurization schedule including secondary pressurization and tertiary pressurization may be utilized depending on the thickness and shape of the optical element to be molded. Such a multistage pressurization schedule can increase the surface accuracy and thickness accuracy of the molded optical element and is especially effective in highly accurately molding the concave meniscuses and double-concave lenses which are difficult to mold.

EXAMPLES

Example 1

The press molding apparatus shown in FIG. 1 and FIG. 2 is used to press-mold a double-convex lens (diameter: 12.8 mm, central thickness: 2.02 mm) having a flat portion at the peripheral edge. A space between the two ball screws 33, 33 is 200 mm, and four sets of molding dies 22, 23 are incorporated into the mother dies 20a, 20b, and the high frequency inducing heating heaters 25 are used as the heating means. For the glass preform to be molded, barium borosilicate acid based glass whose transition temperature Tg is 500° C. and whose yield point temperature Ts is 540° C. is used, and it has been hot-molded in advance into a double-convex curved surface shape and has a surface with a carbon-based film. The molding dies 22, 23 are made of silicon carbide (SiC), and comprise an upper die, a lower die and a cylindrical drum mold regulating the upper and lower dies. Carbon-based releasing films are applied to the molding surfaces of the upper die and the lower die. The molding dies 22, 23 are incorporated into the mother dies 20a, 20b made of a tungsten alloy so that the load is applied to the mold even if the upper and lower mother dies 20a, 20b again contact.

The glass preform is preheated to 610° C. and the molding dies 22, 23 are preheated to 580° C., and the four preheated glass preforms are dropped and supplied onto four lower die molding surfaces, and immediately the lower die 23 is lifted with repeated positional control into proximity to the upper die 22. The two ball screws 33, 33 that are provided in rows for rotation shafts of the servo motors M1, M2, respectively, are synchronously rotated, thereby lifting the ascending/descending member 32 at a velocity of about 2.5 mm/s. The ascending/descending member 32 ascends while keeping horizontal in the vertical direction such that the main shaft 24 on which the lower mother die 20b is mounted ascends without tilting.

About three seconds after the start of pressing, pressing is fully accomplished until the upper mother die 20a and the lower mother die 20b come in contact. After contacting, the preset torque limiter is actuated to perform pressurization with a load of about 400 kgf. Cooling is performed at 80° C./min while the upper and lower mother dies are in contact, and at 480° C., the lower die is lowered to take out the molded lens. Immediately after this, the mother dies are moved to heating positions to start heating, thus moving to the next press cycle. This pressing is repeated 100 times, thereby obtaining 400 lenses. Forty of them are selected, and the thickness of the flat portion at the peripheral edge is measured for measurement of tilts. As a result, an average tilt is 0.8 arcminutes and the maximum tilt is 1.5 arcminutes, and all of them satisfy a reference value.

Example 2

The press molding apparatus similar to that in Example 1 above is used to press-mold a convex meniscus (diameter: 12 mm, central thickness: 2.10 mm) having a flat portion at the peripheral edge. For the glass preform to be molded, the material similar to that in Example 1 is used.

After the glass preform preheated to 610° C. is dropped and supplied onto the molding surface of the lower die 23 preheated to 580° C., the lower die 23 is immediately lifted with repeated positional control into proximity to the upper die 22. The positional control is performed at every 4 ms so that a lifting speed (pressing speed) at this point will be 2.5 mm/s.

About two seconds after the start of pressing, coolant gas is blown to the molding dies 22, 23 to start cooling at a rate of 80° C./min. In addition, the lower die 23 still keeps ascending at a certain velocity after the start of cooling. Soon, when the central thickness of the mold has reached 2.2 mm (immediately before the target value), the lifting of the lower die 23 is stopped (zero pressing speed), and this position is maintained. The cooling is further continued, and when the temperature of the molding dies 22, 23 has reached 550° C., the secondary pressurization is started. At this point, the set value is changed for the positional control to be performed at every 100 ms so that the pressing speed in the secondary pressurization will be 0.01 mm/s. About fifteen seconds after the secondary pressurization has been started, the upper and lower mother dies 20a, 20b have come in contact.

The cooling is continued in this state, and after the glass mold in the molding dies 22, 23 has reached the transition point Tg, the lower die 23 is lowered and the molded lens is taken out. Subsequently, the mother die 20b is moved to the heating position to start heating, thus moving to the next press cycle. This pressing is repeated 100 times, and forty lenses are optionally extracted from the obtained lenses, and the thickness of the flat portion is measured to calculate tilts. As a result, an average tilt is 0.7 arcminutes and the maximum tilt is 1.5 arcminutes, and all of them satisfy a reference value.

According to the present invention, the molding accuracy of the press-molded article, particularly the eccentric accuracy (prevention of molding tilt, molding shift) can be made high without, for example, tilting the main shaft of the press molding apparatus. Moreover, the size of the apparatus is not increased even if a moving stroke of the molding die is increased.

INDUSTRIAL APPLICABILITY

The present invention can be applied to the press molding of molded articles in which high molding accuracy is requested, and is especially suitable for the press molding of optical lenses used in image pickup apparatuses such as digital cameras and recording/reproducing apparatuses of optical recording media such as DVDs.

What is claimed is:

1. A press molding apparatus comprising:
   upper and lower molding dies each having a molding surface facing each other, and
   a driving device which moves at least one of the upper and lower molding dies in a vertical direction so that the upper and lower molding dies are opened and closed,
   wherein the driving device comprises a main shaft which supports the at least one of the upper and lower molding dies,
   an ascending and descending member which, while supporting the main shaft, ascends and descends,
   a plurality of screw shafts which is located eccentrically from an axis line of the main shaft, and engages a plurality of screws formed in the ascending and descending member in order to move up and down the ascending and descending member,
   a driver which synchronously rotates each of the screw shafts, and
   a controller which controls the driver.

2. The press molding apparatus according to claim 1, wherein the plurality of the screws formed in the ascending and descending member is provided symmetrically with respect to the main shaft.

3. The press molding apparatus according to claim 2, wherein the plurality of the screw shafts is equally subjected to loads when the upper and lower molding dies are closed for press molding.

4. The press molding apparatus according to claim 2, wherein the driver is provided for each of the plurality of the screw shafts, and the controller controls driving of each of the drivers.

5. The press molding apparatus according to claim 2, wherein the controller performs positional control which controls a position of the at least one of the upper and lower molding dies during a movement by rotation of the screw shafts.

6. A press molding method of an optical element using a press molding apparatus, wherein said press molding apparatus comprises:
   upper and lower molding dies each having a molding surface facing each other, and
   a driving device which moves at least one of the upper and lower molding dies in a vertical direction so that the upper and lower molding dies are opened and closed,
   wherein the driving device comprises a main shaft which supports the at least one of the upper and lower molding dies,
   an ascending and descending member which, while supporting the main shaft, ascends and descends,
   a plurality of screw shafts which is located eccentrically from an axis line of the main shaft, and engages a plurality of screws formed in the ascending and descending member in order to move up and down the ascending and descending member,
   said press molding method comprising:
   preheating the upper and lower molding dies to a predetermined temperature,
   supplying a heated and softened material to the lower molding die, and
   press-molding the material by closing the upper and lower molding dies by a synchronous rotation of the screw shafts.

7. A press molding method of an optical element using a press molding apparatus comprising upper and lower molding dies each having a molding surface facing each other and a driving device which moves at least one of the upper and lower molding dies in a vertical direction so that the upper and lower molding dies are opened and closed,
   said press molding method comprising the steps of:
   preheating the upper and lower molding dies to a predetermined temperature,
   supplying a heated and softened material to the lower molding die, and
   press-molding the material by closing the upper and lower molding dies,
   wherein the at least one of the upper and lower molding dies is moved by a plurality of screw shafts synchronously rotating an ascending and descending member which engages the screw shafts and supports the at least one of the upper and lower molding dies, wherein a position of the at least one of the upper and lower molding dies is controlled by the driving device during a movement.

* * * * *